(12) United States Patent
Hall (10) Patent No.: US 6,898,013 B2
(45) Date of Patent: May 24, 2005

(54) OPTICAL TRANSPOSE SYSTEM (75) Inventor: Trevor James Hall, London (GB)

(73) Assignee: University of Ottawa, Ottawa (CA)

( * ) Notice: Subject to any disclaimer, the term of this patent is extended or adjusted under 35 U.S.C. 154(b) by 0 days.

(21) Appl. No.: 10/344,879

(22) PCT Filed: Aug. 14, 2001

(86) PCT No.: PCT/GB01/03643
§ 371 (c)(1),
(2), (4) Date: Jul. 22, 2003

(87) PCT Pub. No.: WO02/15633
PCT Pub. Date: Feb. 21, 2002

(65) Prior Publication Data
US 2004/0013341 A1 Jan. 22, 2004

(30) Foreign Application Priority Data
Aug. 16, 2000 (GB) .............................................. 0020046

(51) Int. Cl.⁷ ............................................. G02B 27/10

(52) U.S. Cl. ...................................................... 359/618
(58) Field of Search ................................. 359/618, 619, 359/620–624, 626, 559–560, 738; 398/45, 88

(56) References Cited

FOREIGN PATENT DOCUMENTS

JP          61288529          12/1986

OTHER PUBLICATIONS

H.J. White et al; Optically connected parallel machine: Design, performance and application; IEE Proceedings: Optoelectronics, Institution of Electrical Engineers; Jun. 18, 1999; pp. 125–136; Stevenage, GB.

Primary Examiner—Georgia Epps
Assistant Examiner—Alicia M. Harrington
(74) Attorney, Agent, or Firm—Alston & Bird LLP (57) ABSTRACT An optical transpose system has an array of multiplexing mesolenses (3) and an array of demultiplexing mesolenses (5) with a macrolens (4) positioned between them.

33 Claims, 3 Drawing Sheets

OPTICAL TRANSPOSE SYSTEM

FIELD OF THE INVENTION

The present invention relates to a method of, and apparatus for the optical transpose of signals, that is to say the optical re-arrangement of signals.

BACKGROUND OF THE INVENTION

In a multi-stage interconnection network using optical interconnection for use within multi-processor computer architecture, it is necessary to have an optical transpose system. Thus, in principle, optical interconnect technologies offer several advantages over electrical systems. Connections can be made at higher speeds with less crosstalk and less power consumption than electrical channels. The power required is almost independent of the length of the connection, at least over the length of connections involved within a parallel configuration.

Figure 1:
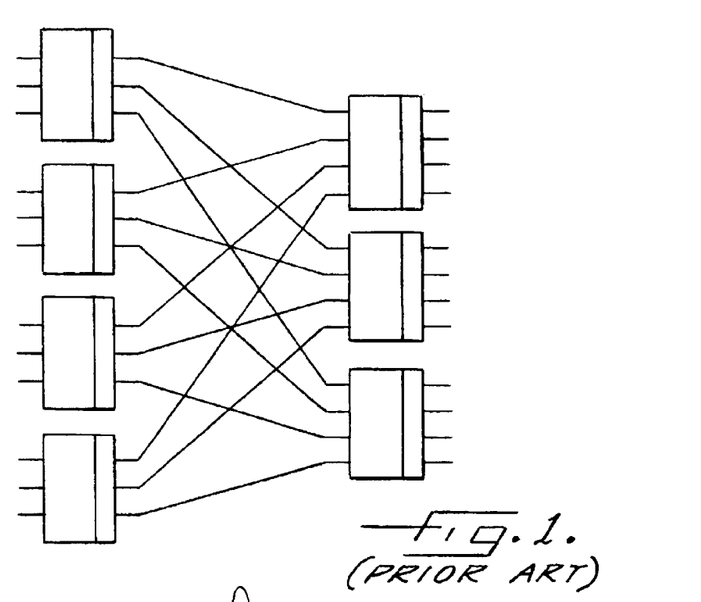
FIG. 1 illustrates a generic electronic subsystem in accordance with the prior art consisting of N modules in a first stage connected to M modules in a second stage.

FIG. 1 illustrates a generic electronic sub-system consisting of N modules in a first stage connected to M modules in a second stage. If a signal path is to exist between each first stage module and each second stage module, each first stage module requires M output ports, each of which is linked to a respective input port of each of the second stage modules. Conversely and equivalently, each second stage module requires N input ports each of which is linked to a respective output port of each first stage module N. In the sub-system illustrated N=4 and M=3, through it will be appreciated that these numbers would be different in different applications.

Let the symbol n index modules in the first stage and the input ports of each second stage module, and the symbol m index modules in the second stage and the output ports of each module in the first stage. The interconnection is then described by the transposition:

$$(n,m) \rightarrow (m,n)$$

that is to say the port m of the module n in the first stage is connected to the port n of module m in the second stage.

There are advantages in implementing interconnections optically. FIG. 1 graphically illustrates that the transpose interconnection involves a large number of crossovers. This presents problems for a planar technology implementation, but does not present problems for a free-space optics implementation. It is then more natural to group the ports of each module and to group the modules together in two-dimensional arrays substantially in a plane.

An optical transpose system is described in an article in Optics Letters, 18 pages 1083–1085 (1993) by G C Marchand, P Harvey and S C Essener entitled 'The Optical Transpose Interconnection System Architectures. This optical system has two stages, each consisting of an array of mesolenses that image the light from an array of light sources on an input plane onto an array of receiving devices on an output plane. The optical system suffers from severe aberrations due to the off-axis imaging arrangement of similar-sized mesolenses. As described, the mesolenses intercept only a fraction of the light emerging from a divergent source such as a light emitting diode (LED), and this leads to a high insertion loss and the potential for crosstalk if the light not captured is not fully blocked. Spatially-coherent sources individually directed into the appropriate mesolenses could overcome these problem, but would require beam steering components at the input plane; and also, in the case of a monomode receiving device, at the output plane.

SUMMARY OF THE INVENTION

The aim of the invention is to provide an improved form of optical transpose system.

The present invention provides apparatus for the optical spatial re-arrangement of signals, the apparatus comprising:
a) an input means;
b) an array of first optical systems;
c) a second optical system;
d) an array of third optical systems; and
e) an output means;
the input means being constituted by a first plurality of input sources, each of which is constituted by a second plurality of light sources;
the output means being constituted by a third plurality of output devices, each of which is constituted by a fourth plurality of light sinks;
each of the first optical systems being associated with, and corresponding to, the light sources of a respective input source; and
each of the third optical systems being associated with, and corresponding to, the light sinks of a respective output device;
the apparatus being such that the optical beams from the light sources of each input source pass through the associated first optical system where they are re-directed, the re-directed beams then pass through the second stage optical system where the beams from each input source are re-arranged, each of the re-arranged beams associated with each input source then enters a respective third optical system, and each of the third optical systems re-directs all the beams incident thereupon to the light sinks of the associated output device.

Advantageously, there are the same number of light sinks as light sources.

Preferably, the light sources, the array of first optical systems, the second optical system, the array of third optical systems, and the light sinks are arranged in substantially parallel planes, and the optical axis of the second optical system is substantially perpendicular to these planes.

Conveniently, the second stage optical system forms in its exit aperture substantially the Fourier transform of the light field at its entrance aperture.

Preferably, the second stage optical system comprises a macrolens lens with its front focal plane in substantial alignment with its entrance aperture, and with its back focal plane in substantial alignment with its exit aperture. The macrolens may be a Fourier lens.

In a preferred embodiment, the array of first optical systems formats the beams at its entrance in a form at its exit suitable for presentation to the second optical stage, and the array of third optical systems reformats the beams at its entrance in a form at its exit suitable for presentation to the output means. Preferably, the optical systems in the first array and in the third array perform substantially the Fourier transform at their individual exit apertures of the optical fields at their individual entrance apertures. The array of first optical systems may comprise an array of first mesolenses, each of which has its front focal plane in substantial alignment with its entrance aperture and its back focal plane in substantial alignment with its exit aperture. Similarly, the array of third optical systems may comprise an array of second mesolenses, each of which has its front focal plane in substantial alignment with its exit aperture and its back focal plane in substantial alignment with its entrance aperture.

Advantageously, the mesolenses in each array have the same focal length, and preferably the mesolenses in each array are Fourier lenses.

Preferably, the spacing between the first mesolenses and the light sources is the focal length of the first mesolenses so that parallel incident beams are focussed at the focal point of each first mesolens, and the spacing between the first mesolenses and the macrolens is the sum of the focal lengths of the first mesolenses and the focal length of the macrolens, the spacing between the second mesolenses and the macrolens in the sum of the focal lengths of the second mesolenses and the macrolens, and the spacing between the second mesolenses and the light sinks in the focal length of the second mesolenses.

The number of light sources may be from 16 to 65536; though, in principle, there is no restriction to the higher limit. 256 light sources may be a typical number, and 65536 may be a practical limit.

In a preferred embodiment, the light sources are vertical cavity semiconductor lasers, light emitting diodes or other optoelectronic devices that emit light and which can be directly modulated by electrical signals, or liquid crystal cells, multiple quantum well devices, electro-optic crystals or other optoelectronic devices that modulate light incident upon them from another light source in response to electrical signals, or monomode or multimode waveguides or optical fibres, or other optoelectronic components that transport light from suitably modulated light sources at locations that may be remote from the apparatus.

The light sinks may be photoreceivers or other optoelectronic devices that convert absorbed light into outgoing electrical signals, or monomode or multimode fibres, or other optoelectronic components that may transport light to receivers at locations that may be remote from the apparatus.

Advantageously, the light sources and the light sinks are displaced an appropriate distance in front of and behind the respective front and back focal planes respectively of the first and second mesolenses to achieve imaging between the light sources and the light sinks.

The apparatus may further comprise first and second microlens arrays placed respectively between the first mesolenses and the light sources, and between the second mesolenses and the light sinks, with one microlens of the first array per light source, and one microlens of the second array per light sink. This permits the apparatus to be used with light sources whose beam size is very small. In this case, the light sources are vertical cavity semiconductor lasers or optical fibres.

In a preferred embodiment, the light sources are centred on points in a plane which points are constructed by replicating a first pattern of points at each of a second pattern of points, such that each replication is a simple translation of the first pattern of points with its origin aligned with the associated point of the second pattern, the light sources associated with a given input source are placed at points within one replication, no more than one light source is placed at one point, and no more than one input source is placed at each replication, the spacing between the points of the first pattern being sufficient to separate the light sources and the spacing between the points of the second pattern being sufficient to ensure the input sources are separated. In this case, the light sinks may be centred on points in a plane which points are constructed by replicating a third pattern of points at each point of a fourth pattern of points, such that each replication is a simple translation of the third pattern of points with its origin aligned with the associated point of the fourth pattern, the light sinks associated with a given output device are placed at points within one replication, no more than one light sink is placed at one point, and no more than one output device is placed at each replication, the spacing between the points of the third pattern being sufficient to separate the light sinks, and the spacing between the points of the fourth pattern being sufficient to ensure the output devices are separated.

Preferably, the fourth pattern of points is an enlargement of the first pattern of points, and the second pattern of points is an enlargement of the third pattern of points.

Where the arrays of first and third optical systems are mesolenses, each first mesolens corresponds to, and is associated with, a respective input source, and its optical axis is substantially aligned with the associated point of the second pattern of points and each second mesolens corresponds to, and is associated with, a respective output device, and its optical axis is substantially aligned with the associated point of the fourth pattern of points, the origins of the second and fourth patterns of points being substantially aligned with the optical axis of the macrolens.

In this case, the ratio of the focal length of the macrolens to the focal length of the first mesolenses is substantially equal to the magnification between the fourth pattern of points and the first pattern of points, and the ratio of the focal length of the macrolens to the focal length of the second mesolenses is substantially equal to the magnification between the second pattern of points and the third pattern of points.

Advantageously, a respective plurality of closely-spaced but separate sources constitutes each light source, and a plurality of closely-spaced but separate sinks constitutes each light sink so that each of the closely-spaced sources is imaged onto a corresponding sink. Each light source effectively has a plurality of channels which are directed to the corresponding light sink (having a plurality of separate sinks) in the manner of a bus.

Conveniently, the light sinks and the light sources are collocated to provide bi-directional operation. In this case, a respective optoelectronic device may constitute a respective light source, and a respective optoelectronic device constitutes each light sink, each optoelectronic device being capable of bi-directional operation. Advantageously, each optoelectronic device is an optical fibre or a ping-pong device that operates in a laser mode or a receiver mode. Alternatively, each optoelectronic device is constituted by transmitting and receiving devices adjacent to each other.

In a modified form of apparatus, the number of input sources is the same as the number of output devices, and a plane mirror or equivalent curved mirror is placed behind the macrolens.

The apparatus may further comprise mirrors to reflect the light, and the system is folded into a flat Z-shape. These mirrors may be combined with the mesolenses, or equivalent curved mirror arrays may be substituted for the mesolens arrays.

BRIEF DESCRIPTION OF DRAWINGS SECTIONS

An optical transpose system constructed in accordance with the invention will now be described in greater detail, by way of example, with reference to FIGS. 2–5 of the drawings.

DETAILED DESCRIPTION OF PREFERRED EMBODIMENTS

Figure 2:
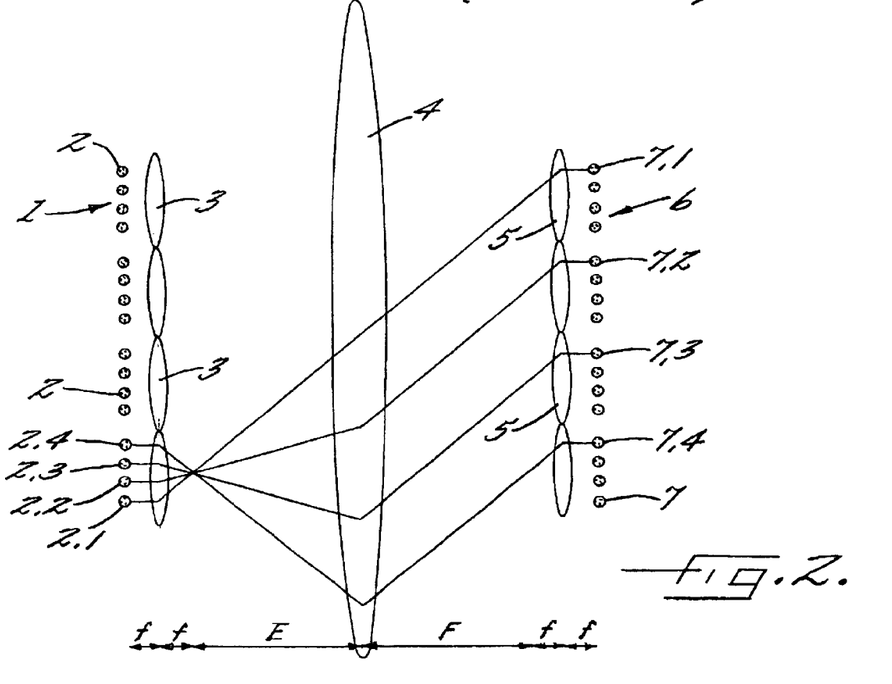
FIG. 2 is a schematic representation of the system.
Figure 5:
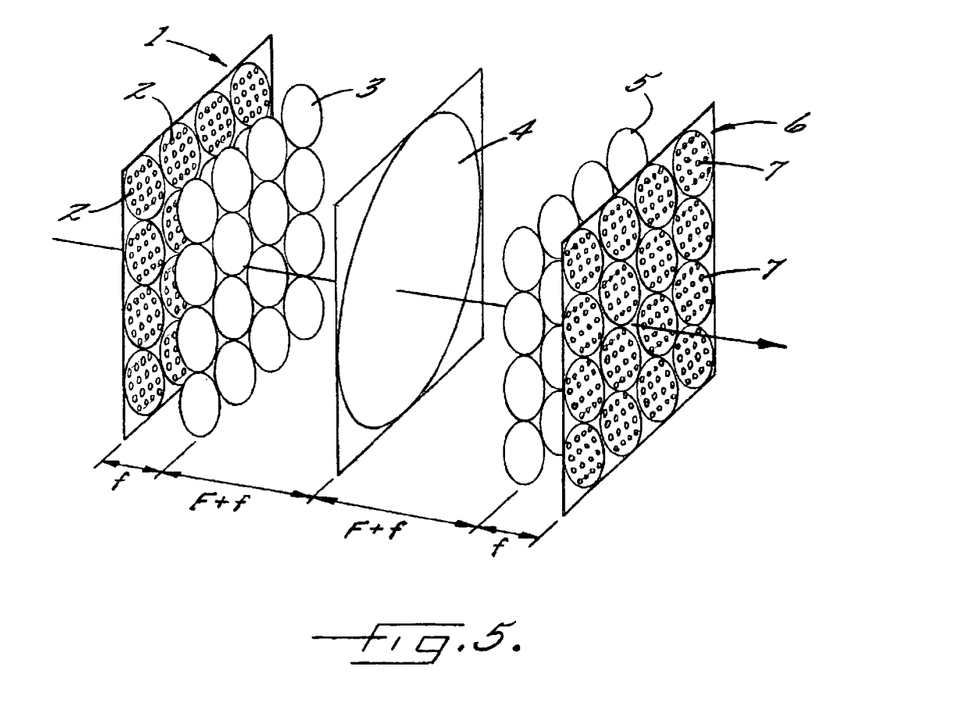
FIG. 5 is a perspective view of the system.

Referring to the drawings, FIGS. 2 and 5 show an optical transpose system having a regular grid of sixteen input sources 1, each of which is constituted by a regular grid of sixteen individual light sources 2. The light sources 2 transmit signals, in the form of suitably modulated light beams, to a regular grid of sixteen mesolenses 3. The light sources 2 may be vertical cavity semiconductor lasers, LEDs, other optoelectronic devices that emit light, and may be directly modulated by electrical signals, liquid crystal cells, multiple quantum well devices, electro-optic crystals, or other optoelectronic devices that modulate light incident thereupon from another light source in response to electrical signals. The light sources 2 may also be monomode or multimode wave guides or optical fibres, or other optoelectronic components that transport light from suitably modulated light sources at locations that may be remote from the system.

The light sources 2 are centred on points in a plane. These points are constructed by replicating a first pattern of points (a regular grid of sixteen points) at each of a second pattern of points (also a regular grid of sixteen points—these points being the centre points of the input sources 1), such that each replication is a simple translation of the first pattern of points with its origin aligned with the associated point of the second pattern. The light sources 2 associated with a group of sources (that is say a given input source 1) are placed at points within one replication. No more than one light source 2 is placed at one point, and no more than one group of sources is placed at each replication. The spacing between the points of the first pattern is sufficient to separate the light sources 2, and the spacing between the points of the second pattern is sufficient to ensure the groups (the input sources 1) are separated.

Each mesolens 3 corresponds to, and is associated with, a group 1 of light sources 2, and its optical axis is substantially aligned with the associated point of the second pattern of points. The optical beams from the light sources 2 of each input source 1 thus pass through the associated mesolens 3, where they are re-directed. The re-directed beams then pass through a macrolens 4, where the beams from each input source 1 are re-arranged. The re-arranged beams associated with each input source 1 then pass to respective ones of a regular grid of sixteen mesolenses 5, where they are caused to be re-directed to a regular grid of sixteen output devices 6, each of which is constituted by a respective regular grid of sixteen light sinks 7. The arrangement is such that each of the light sources 2 of a given input source 1 is directed to a respective light sink 7 of a different output device 6. This is illustrated partially in FIG. 2, which shows one column of light sources 2 of the lowermost input source 1 directed to respective uppermost light sinks 7 of respective columns of light sinks in a column of output devices 6, these sources and sinks being identified by the references 2,1, 2,2, 2,3 and 2,4 and 7,1, 7,2, 7,3 and 7,4 respectively. The system thus allows any light source 2 to be directed to any light sink 7.

The light sinks 7 receive the light beams and demodulate the signals. These light sinks 7 may be photoreceivers or other optoelectronic devices that convert absorbed light into outgoing electrical signals. Or they may be monomode or multimode fibres, or other optoelectronic components that transport light to receivers at locations that may be remote from the apparatus.

The light sinks 7 are, like the light sources 2, centred on points in a plane. These points are constructed by replicating a third pattern of points (a regular grid of sixteen points) at each point of a fourth pattern of points (also a regular grid of sixteen points—these points being the centre points of the output devices 6), such that each replication is a simple translation of the third pattern of points with its origin aligned with the associated point of the fourth pattern of points. The light sinks 7 associated with a group of light sinks (that is to say a given output device 6) are placed at points within one replication. No more than one light sink 7 is placed at one point, and no more than one output device 6 is placed at each replication. The spacing between the points of the third pattern is sufficient to separate the light sinks 7, and the spacing between the fourth pattern of points is sufficient to ensure the output devices 6 are separated.

Each mesolens 5 corresponds to, and is associated with, the light sinks 7 of a respective output device 6, and its optical axis is substantially aligned with the associated point of the fourth pattern of points. The origins of the second and fourth patterns of points are substantially aligned with the optical axis of the macrolens 4.

Each of the mesolenses 3 and 5 has a focal length f, and the macrolens 4 has a focal length F. The mesolenses 3 are spaced from the input sources 1 by the focal length f so that parallel incident beams from the light sources 2 are focussed at the focal point of each mesolens. The spacing between the array of mesolenses 3 and the macrolens 4 is the sum of the focal lengths of the mesolenses and the macrolens (f+F). Similarly, the spacing between the mesolenses 5 and the output devices 6 is the focal length f of the mesolenses, and the mesolenses are spaced from the macrolens 4 by the sum of the focal length of the mesolenses and the macrolens (f+F).

The macrolens 4 and each of the macrolenses 3 and 5 is a Fourier lens, that is say a reversible lens having a mirror plane of symmetry normal to its optical axis, but is appropriately designed to form a stigmatic image of the plane at infinity in its back focal plane. This property does not depend on a paraxial approximation. A well-designed Fourier transform lens may be a compound lens containing many elements, it may employ reflective or diffractive elements, and it may operate in transmission or reflection. Within the paraxial approximation, every lens can be considered to perform a Fourier transform. As a consequence, and for simplicity of exposition only, the Fourier lenses are illustrated here as single thin lenses.

The ratio of the focal length F of the macrolens 4 to the focal length f of the mesolenses 3 is set substantially equal to the magnification between the fourth pattern of points and the first pattern of points. Similarly, the ratio of the focal length F of the macrolens 4 to the focal length f of each of the mesolenses 5 is set substantially equal to the magnification between the second pattern of points and the third pattern of points.

Figure 4:
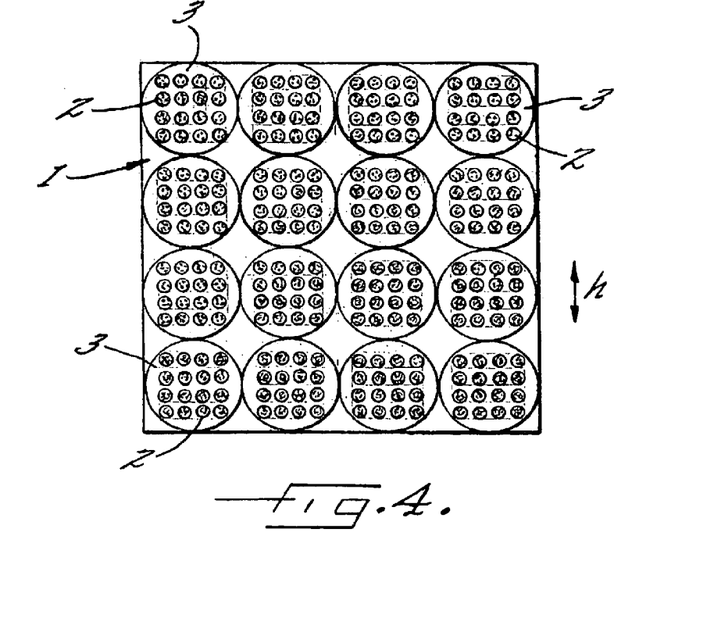
FIG. 4 shows an arrangement of an array of mesolenses forming a part of the system of FIG. 2.

Each mesolens 3, 5 has sufficient lateral extent to perform the Fourier transform operation with sufficient accuracy, and so as to collect light efficiently from its respective input source 1, or to deliver light to its respective output device 6. The spacing of the points in the second and fourth patterns of points is sufficient to prevent physical obstruction of each mesolens 3, 5 by neighbouring mesolenses.

The operation of the optical transpose system may be understood as follows. Up to inversion, the Fourier trans form is its own inverse. A cascade of two Fourier lenses with a common optical axis thus forms an imaging system between the front focal plane of the first lens and the back focal plane of the second lens. This is the classical telescope arrangement, with a magnification given by the ratio of two focal lengths. If the optical axis of the first lens in the "telescope" is displaced normal to the optical axis of the second lens, the shift invariance of the Fourier transform results in no change to the image, except for multiplication by a linear phase factor. Physically, the image is formed at the same position in the back focal plane of the second lens in the "telescope", but propagates at an angle determined by the displacement of the axis of the first lens of the "telescope".

Each mesolens 3 in combination with the macrolens 4 forms such a "telescope", and presents a magnified image of its respective input source 1 (the associated sixteen light sources 2) in the back focal plane of the macrolens. The images of each group of input sources 2 are overlaid but distinguishable due to their different propagation directions away from the back focal plane of the macrolens 4. The magnification is such that the mesolenses 5 intercept the light originating from sources sharing a common position within their groups. The mesolenses 5 resolve the different propagation directions into spatially-separated beams in the output plane of the light sinks 7.

Similarly, each mesolens 5 in combination with the macrolens 4 forms such a "telescope", and presents a magnified image of its respective group of light sinks 7 in the front focal plane of the macrolens. The images of each group of sinks 7 are overlaid, but distinguishable due to the different propagation of incoming beams required to reach a particular sink. The magnification is such that the mesolenses 3 present their light to the image of each sink 7 sharing a common position within their groups. These mesolenses 3 resolve a different acceptable propagation directions, so that beams able to reach a given sink 7 are spacially separated in the input plane of the sources.

Thus, every group of light sources 2 can see one sink 7 in the same relative position within each output device 6 (group of sinks 7). Conversely, each group of sinks 7 can see one light source 2 in the same relative position within each group of light sources. Thus, each light source 2 is connected to a sink 7 and vice versa, and the interconnection pattern corresponds to a transposition.

Figure 3:
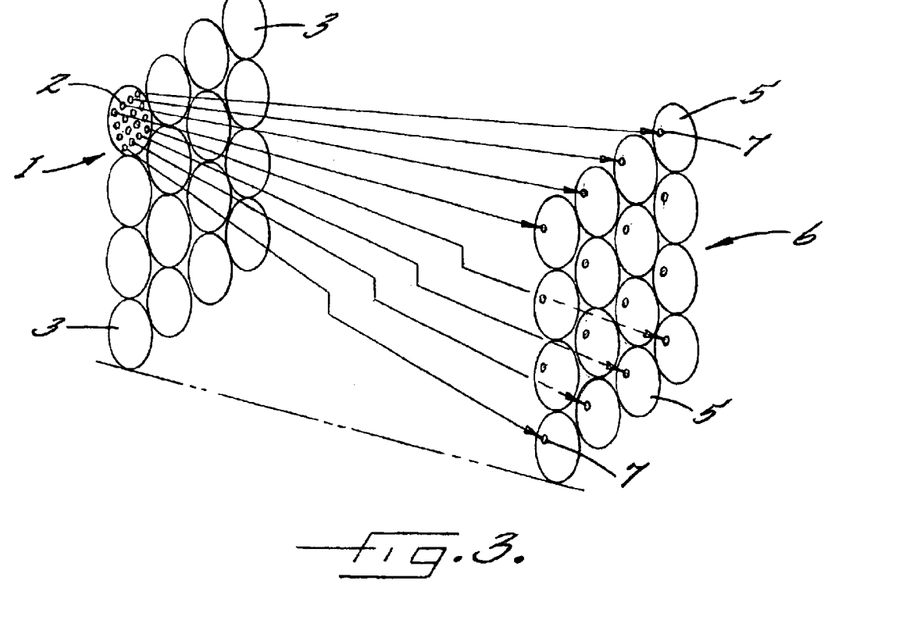
FIG. 3 is an illustration of how an optical transpose occurs.

FIGS. 2 and 3 illustrates how the optical transpose occurs, and shows some of the light rays concerned. Thus, FIG. 3 shows both regular grids of mesolenses 3 and 5, and illustrates how the light beams from the sixteen light sources 2 of a given input source 1 are transposed via the mesolenses 3, the macrolens 4 (not shown in FIG. 3), and the mesolenses 5 to the associated light sinks 7. It will be seen that each of the light sources 2 of a given input source 1 is transposed to a respective light sink 7 within each of the sixteen output devices 6, each of the light sinks being in the same grid position. Similarly, FIG. 2 shows how the light rays from four of the light sources 2 of a given input source 1 pass through the corresponding mesolens 3, the macrolens 4, and each of four mesolenses 5 and an associated output sink 7. It will be apparent, therefore, that each of the 256 light sources 2 is mapped onto a respective one of the light sinks 7.

A feature of the apparatus is that there is no imaging relation between the light sources 2 and the light sinks 7. The relation is an optical Fourier transform with an effective focal length $f_e$ given by the general formula $$f_e = \frac{f_1 f_3}{f_2}$$

where $f_1$, $f_2$, $f_3$ are the focal lengths of the mesolenses 3, the macrolens 4 and the mesolenses 5.

Assuming, for simplicity, circular symmetry about a single beam's axis, the product of a single beam's radius $\Delta q$ and its numerical aperture $\Delta p$ ($\Delta p = n \sin(\Delta \theta)$) is conserved as the beam propagates through the optical system:

where n is the local refractive index, and $\Delta \theta$ is the ray angle with respect to the optical axis.

The fundamental uncertainty relation $\Delta q \Delta p \geq \lambda/\pi$ is also obeyed, with equality achieved by Gaussian beams which accurately describe beams emitted by structures supporting a single transverse mode, for example, monomode fibres and lasers:

where $\lambda$ is the wavelength of the light.

The input beam parameters ($\Delta q_1$, $\Delta p_1$) and output beam parameters ($\Delta q_3$, $\Delta p_3$) are, therefore, related by:

$$\Delta q_1 \Delta p_1 = \Delta q_3 \Delta p_3 \geq \lambda/\pi \text{ but:}$$

$$\Delta p_3 = f_4 \Delta q_1$$

The beam size at the output is determined by the angular divergence of the beam at the input. The spacing of the input beams according to the first pattern $\delta_1$, the spacing of the output beams according to the third pattern of points $\delta_3$, and the effective focal length $f_e$ may, therefore, be chosen to ensure no overlap of beams at the input and output.

The parameters $\delta_1$, $\delta_3$, $f_e$, N and M determine the focal lengths of the lenses:

$$f_1 = \eta_1 \sqrt{N} \, (\delta_1/\delta_3) f_e$$

$$f_2 = \eta_1 \eta_2 \sqrt{N} \sqrt{M} f_e$$

$$f_3 = \eta_2 \sqrt{M} \, (\delta_3/\delta_1) f_e$$

where N is the number of mesolenses 3, M is the number of mesolenses 5, and the numerical factors $\eta_1$, $\eta_2$ are of the order of unity, and are determined in a detailed design by the requirement that the mesolenses 3, 5 collect all the light incident upon them, and do not physically obstruct each other.

Thus, for the optical transpose system described above, $f_1 = f_3 = f$, $f_2 = F$, $N = 16$ and $M = 16$, so the formulae above become:

$$f_e = f^2/F$$

$$f = f_1 = \eta_1 \sqrt{16} \, (\delta_1/\delta_3) f_e$$
$$= 4\eta_1 (\delta_1/\delta_3) f_e$$

$$f = f_2 = \eta_2 \sqrt{16} \, (\delta_3/\delta_1) f_e$$
$$= 4\eta_2 (\delta_1/\delta_3) f_e \text{ as}$$

$$f_1 = f_2, \delta_1 \approx \delta_3 \text{ and } \eta_1 \text{ and } \eta_2 \approx 1$$

$$\therefore f \approx 4 f_o$$

$$F = \eta_1 \eta_2 \sqrt{16} \sqrt{16} f_e$$

$$\therefore F = 16 f_s$$

The f-numbers $f\#_1$, $f\#_3$ required respectively of the mesolenses 3, 5, and the incoming and outgoing field angles $\alpha$, $\beta$ over which the macrolens 4 must work effectively, may be estimated as:

$f\#_1 = \delta_3/f_e$ $f\#_2 = \delta_1/f_e$ $\tan \alpha = 1/\eta_2 . \delta_1/f_e$ $\tan \beta = 1/\eta_1 . \delta_3/f_e$ These lens parameters may all be kept to within practical bounds by a suitable choice of effective focal length in order to control aberrations. The choice of effective focal length also sets the alignment tolerances at the input and output. These are more stringent the smaller the effective focal length.

The aperture of the macrolens 4 determines the transverse dimensions of the (unfolded) system. For a given f-number, this is proportional to the focal length. The length of the apparatus is also approximately proportional to the focal length of the macrolens 4, which determines the length of the apparatus. For a symmetric transpose, the linear dimensions of the apparatus therefore scale as N, and the volume scales as $N^3$, whilst the number of interconnect paths scales as $N^2$.

It is, therefore, a feature of the apparatus that its growth in volume with number of interconnections supported is modest and, with appropriate design and precision engineering, it can be very compact.

The most compact apparatus results if $\delta_1$, $\delta_3$ are adjusted, subject to crosstalk constraints, so that the beam size is comparable to the beam spacing, thus permitting a small effective focal length. The ultimate in compactness is then achieved by the use of Gaussian beams.

If necessary, additional microlens arrays may be placed at the input and output of the optical system, one microlens per light source 2 and light sink 7, to better match the source and sink beam characteristics to the apparatus.

Imaging between the sources 2 and the sinks 7 may be achieved, either by displacing the sources and the sinks an appropriate distance in front of and behind the respective front and back focal planes of the respective mesolens arrays 3 and 5, or by the use of additional mesolens arrays with one mesolens per source.

A feature of the imaging system is that several closely-spaced but separate light sources 2 may be substituted for the single source of the prior art. Several closely-spaced but separate sinks 7 similarly replace the single sinks, so that each of the closely-spaced sources 2 is imaged onto a corresponding sink 7. The transposition then becomes a transposition of buses. Equivalently, each link of the transposition is speeded up by the provision of additional spatial channels to each link. This is valuable in switching applications.

A feature of this apparatus is that it is reversible, that is the apparatus may operate in the reverse direction if sinks 7 and the sources 2 are exchanged. Bi-directional operation is also possible by collocating sinks 7 and sources 2. This might be done, either by using optoelectronic devices capable of bi-directional operation, such as optical fibres or ping-pong devices that operate in a laser mode or a receiver mode, or by placing transmitting and receiving devices adjacent to each other.

In a completely symmetric case, where the number of groups is the same at the input and output, the reversibility may be exploited to half the length of the apparatus, by operating the macrolens 4 in reflection. This may be achieved by placing a plane mirror behind a macrolens 4 with double the focal length, or by using an equivalent curved mirror.

In designs that employ a long focal length macrolens 4, the apparatus may be made more compact by using mirrors and folding the system. These mirrors may be combined with the lenses, or equivalent curved mirrors substituted for the lenses.

The system may also be made more compact by replacing the convex mesolens arrays 3, 5 by concave mesolenses placed within the focal planes of the macrolens 4 at one focal length from the focal planes.

It is also a feature that the apparatus can operate over a wide range of optical wavelengths. It is particularly insensitive to wavelength if no diffractive optical elements are used. This permits applications to wavelength division multiplexing systems where several signals are carried by light of different wavelengths over a common spatial channel. Equivalently, each link of the position is speeded up by the provisional of additional wavelength channels to each link. This is valuable in switching applications.

What is claimed is:

1. Apparatus for the optical spatial re-arrangement of signals, the apparatus comprising:

a) an input means;

b) an array of first optical systems;

c) a second optical system;

d) an array of third optical systems; and e) an output means;

the input means being constituted by a first plurality of input sources, each of which is constituted by a second plurality of light sources;

the output means being constituted by a plurality of output devices, each of which is constituted by a plurality of light sinks;

each of the first optical systems being associated with, and corresponding to, the light sources of a respective input source; and each of the third optical systems being associated with and corresponding to, the light sinks of a respective output device;

the apparatus being such that the optical beams from the light sources of each input source pass through the associated first optical system where they are re-directed, the re-directed beams then pass through the second optical system where the beams from each input source are re-arranged, each of the re-arranged beams associated with each input source then enters a respective third optical system, and each of the third optical systems re-directs all the beams incident thereupon to the light sinks of the associated output device.

2. Apparatus as claimed in claim 1, wherein there are the same number of light sinks as light sources.

3. Apparatus as claimed in claim 1, wherein the light sources, the array of first optical systems, the second optical system, the array of third optical systems, and the light sinks are arranged in substantially parallel planes, and the optical axis of the second optical system is substantially perpendicular to these planes.

4. Apparatus as claimed in claim 1, wherein the second optical system forms in an exit aperture thereof substantially the Fourier transform of the light field at an entrance aperture thereof.

5. Apparatus as claimed in claim 1, wherein the second optical system comprises a macrolens lens with a front focal plane thereof in substantial alignment with an entrance aperture thereof, and with] a back focal plane of the macrolens in substantial alignment with an exit aperture thereof.

6. Apparatus as claimed in claim 5, wherein the macrolens is a Fourier lens.

7. Apparatus as claimed in claim 6, wherein the array of first optical systems formats the beams at its entrance in a form at its exit suitable for presentation to the second optical system, and the array of third optical systems reformats the beams at its entrance in a form at its exit suitable for presentation to the output means.

8. Apparatus as claimed in claim 7, wherein the optical systems in the first array and in the third array perform substantially the Fourier transform at their individual exit apertures of the optical fields at their individual entrance apertures.

9. Apparatus as claimed in claim 8, wherein the array of first optical systems comprises an array of first mesolenses, each of which has its front focal plane in substantial alignment with its entrance aperture and its back focal plane in substantial alignment with its exit aperture.

10. Apparatus as claimed in claim 9, wherein the number of light sources is from 16 to 65536.

11. Apparatus as claimed in claim 9, wherein the number of light sources is from 16 to 256.

12. Apparatus as claimed in claim 9, wherein the array of third optical systems comprises an array of second mesolenses, each of which has its focal plane in substantial alignment with its exit aperture and its back focal plane in substantial alignment with its entrance aperture.

13. Apparatus as claimed in claim 12, wherein the mesolenses in each array have the same focal length.

14. Apparatus as claimed in claim 12, wherein the mesolenses in each array are Fourier lenses.

15. Apparatus as claimed in claim 12, wherein the spacing between the first mesolenses and the light sources is the focal length of the first mesolenses so that parallel incident beams are focussed at the focal point of each first mesolens, and the spacing between the first mesolenses and the macrolens is the sum of the focal lengths of the first mesolenses and the focal length of the macrolens, the spacing between the second mesolenses and the macrolens in the sum of the focal lengths of the second mesolenses and the macrolens, and the spacing between the second mesolenses and the light sinks in the focal length of the second mesolenses.

16. Apparatus as claimed in claim 12, wherein the light sources and the light sinks are displaced an appropriate distance in front of and behind the respective front and back focal planes respectively of the first and second mesolenses to achieve imaging between the light sources and the light sinks.

17. Apparatus as claimed in claim 12, further comprising first and second microlens arrays placed respectively between the first mesolenses and the light sources, and between the second mesloenses and the light sinks, with one microlens of the first array per light source, and one microlens of the second array per light sink.

18. Apparatus as claimed in claim 17, wherein the light sources are vertical cavity semiconductor lasers or optical fibres.

19. Apparatus as claimed in claim 12, wherein the light sources are centered on points in a plane which points are constructed by replicating a first pattern of points at each of a second pattern of points, such that each replication is a simple translation of the first pattern of points with its origin aligned with the associated point of the second pattern, the light sources associated with a given input source are placed at points within one replication, no more than one light source is placed at one point, and no more than one input source is placed at each replication, the spacing between the points of the first pattern being sufficient to separate the light sources and the spacing between the points of the second pattern being sufficient to ensure the input sources are separated.

20. Apparatus as claimed in claim 19, wherein the light sinks are centred on points in a plane which points are constructed by replicating a third pattern of points at each point of a fourth pattern of points, such that each replication is a simple translation of the third pattern of points with its origin aligned with the associated point of the fourth pattern, the light sinks associated with a given output device are placed at points within one replication, no more than one light sink is placed at one point, and no more than one output device is placed at each replication, the spacing between the points of the third pattern being sufficient to separate the light sinks, and the spacing between the points of the fourth pattern being sufficient to ensure the output devices are separated.

21. Apparatus as claimed in claim 20, wherein the fourth pattern of points is an enlargement of the first pattern of points, and the second pattern of points is an enlargement of the third pattern of points.

22. Apparatus as claimed in claim 19, wherein each first mesolens corresponds to, and is associated with, a respective input source, and its optical axis is substantially aligned with the associated point of the second pattern of points and each second mesolens corresponds to, and is associated with, a respective output device, and its optical axis is substantially aligned with the associated point of the fourth pattern of points, the origins of the second and fourth patterns of points being substantially aligned with the optical axis of the macrolens.

23. Apparatus as claimed in claim 19, wherein the ratio of the focal length of the macrolens to the focal length of the first mesolenses is substantially equally to the magnification between the fourth pattern of points and the first pattern of points, and the ratio of the focal length of the macrolens to the focal length of the second mesolenses is substantially equal to the magnification between the second pattern of points and the third pattern of points.

24. Apparatus as claimed in claim 1, wherein the light sources are selected from the group consisting of vertical cavity semiconductor lasers, light emitting diodes or other optoelectronic devices that emit light and which can be directly modulated by electrical signals, liquid crystal cells, multiple quantum well devices, electro-optic crystals or other optoelectronic devices that modulate light incident upon them from another light source in response to electrical signals, monomode or multimode waveguides or optical fibres, and optoelectonic components that transport light from suitably modulated light sources at locations that may be remote from the apparatus.

25. Apparatus as claimed in claim 1, wherein the light sinks are selected from the group consisting of photoreceivers or other optoelectronic devices that convert absorbed light into outgoing electrical signals, monomode or multimode fibres, and optoelectronic components that may transport light to receivers at locations that may be remote from the apparatus.

26. Apparatus as claimed in claim 1, wherein a respective plurality of closely-spaced but separate sources constitutes each light source, and a plurality of closely-spaced but separate sinks constitutes each light sink so that each of the closely-spaced sources is imaged onto a corresponding sink.

27. Apparatus as claimed in claim 1, wherein the light sinks and the light sources are collocated to provide bi-directional operation.

28. Apparatus as claimed in claim 27, wherein a respective optoelectronic device constitutes a respective light source, and a respective optoelectronic device constitutes each light sink, each optoelectronic device being capable of bi-directional operation.

29. Apparatus as claimed in claim 28, wherein each optoelectronic device is an optical fibre or a ping-pong device that operates in a laser mode or a receiver mode.

30. Apparatus as claimed in claim 28, wherein each optoelectronic device is constituted by transmitting and receiving devices adjacent to each other.

31. Apparatus as claimed in claim 27, wherein the number of input sources is the same as the number of output devices, and a plane mirror or equivalent curved mirror is placed behind the macrolens.

32. Apparatus as claimed in claim 1, further comprising mirrors to reflect the light, and the system is folded into a flat Z-shape.

33. Apparatus as claimed in claim 32, wherein the mirrors are combined with the mesolenses, or equivalent curved mirror arrays are substituted for the mesolens arrays.

* * * * *